Sept. 1, 1964  E. H. OHNSMAN  3,146,754
LINE HANDLING DEVICE
Filed April 24, 1962

INVENTOR.
EVERETT H. OHNSMAN,
BY
ATTORNEYS.

United States Patent Office 3,146,754
Patented Sept. 1, 1964

3,146,754
LINE HANDLING DEVICE
Everett H. Ohnsman, 1000 Springfield-N. Hampton Road,
Springfield, Ohio
Filed Apr. 24, 1962, Ser. No. 189,877
7 Claims. (Cl. 114—199)

This invention relates to a mechanical device for handling ropes, lines, and the like, and more particularly for handling lines on a sailboat where a line must be held against a large force, but where no particular additional mechanical advantage is required.

It is of course elementary that a block and tackle apparatus or a series of pulleys connected by a single line will give the operator a tremendous mechanical advantage; that is, with relatively little force, one can overcome a much larger force. However, there are certain situations where such a mechanical advantage is neither feasible nor particularly desirable, but where it is desired only to hold the line or rope in question against a rather large force.

An excellent specific example can be found in small sailboats, where the force exerted on the lines controlling the sails may or may not be so large as to require any mechanical advantage in operating or controlling the sails, but where it is necessary to hold the sail and its controlling line in a particular adjusted position against a substantial force, for a considerable length of time.

In prior art devices, the conventional means for holding such a line has been a cleat. At first, ordinary cleats, around which the line to be held could be wrapped and secured, were used. However, this method suffers from the obvious disadvantage that freeing the line is somewhat difficult; and in a sailboat, a line which cannot be freed in an emergency can lead to disaster. Next came the development of the so-called jam cleats, with which a line was led through a pair of spring loaded, opposing cam jaws having a plurality of teeth on their opposing surfaces, so that a line could be pulled through them in only one direction. To free the line from this device, it was necessary only to raise it upwardly from between the cams, and it would be free. However, while this represents a definite improvement, it still suffers from the disadvantage noted above; namely, that especially in very high winds, it is difficult to free. Furthermore, the jam action of the cleats is very hard on the lines used, and tends to wear them out at an excessive rate.

Accordingly, it is a principal object of the instant invention to provide a device for handling lines which will enable an operator to hold such a line against a relatively large force, for prolonged periods of time, without undue exertion on his part.

A further object of this invention is the provision of such a device which will enable the operator to quickly and positively free the line in an emergency situation.

Still another object of this invention is to provide a device for handling lines which is small and compact in construction, so that its size and weight will not interfere with the operating characteristics of the craft on which it is used.

These objects, along with many others which will undoubtedly appear to the skilled worker in the art upon a reading of the following specification, are accomplished by that certain construction and arrangement of parts, of which an exemplary embodiment will now be described.

Reference is made to the drawings forming a part of this specification, wherein similar reference characters denote like parts throughout the several views, and in which.

Figure 1:
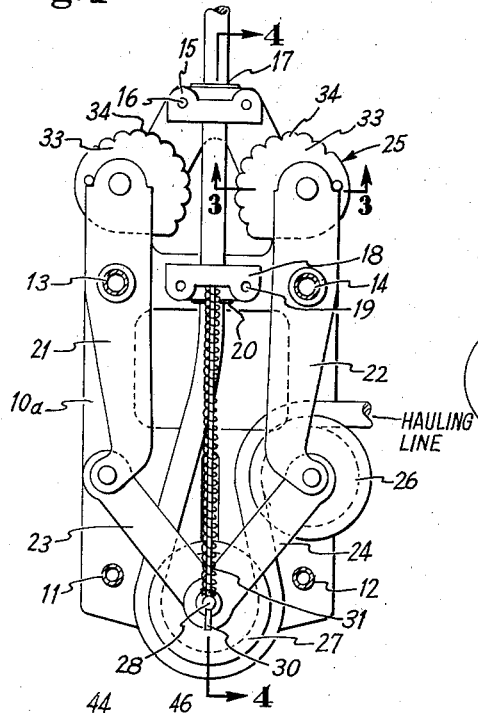
FIGURE 1 is a plan view of a device according to my invention, with the top plate removed to better illustrate the relation of the various parts.

Referring now more particularly to FIGURE 1, the various parts and components are mounted in a frame, which in the drawings is shown as comprised of identical top and bottom plates 10a and 10b, joined by the four hollow spacer elements 11, 12, 13, and 14. (It will of course be noted that the top plate 10b has been omitted from FIGURES 1 and 2 for the sake of clarity and to aid in understanding the operation of the device.) The spacer elements 13 and 14 serve the additional function of acting as pivots for other elements presently to be described.

At one end of the device I provide a guide such as designated at 15, secured to the plates 10a and 10b in any suitable manner, such as the rivets shown at 16. This guide element is provided with a circular opening 17, through which a line may be led. A short distance behind the element 15, I provide an identical guide 18, similarly mounted to the plates 10a and 10b as at 19 and having a circular opening 20.

Figure 4:
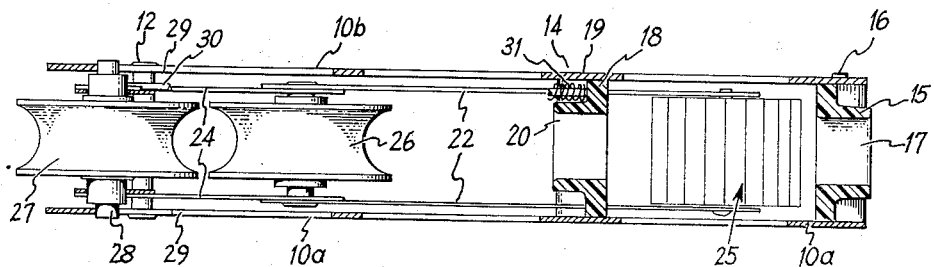
FIGURE 4 is a cross-sectional view taken along the line 4—4 of FIGURE 1.

The four pairs of arms designated at 21, 22, 23 and 24 constitute the primary operational elements of the invention. It will of course be obvious that the arms 21 and 22 are identical in shape, and merely mounted in reverse positions; and this same observation is true of the arms 23 and 24. The arms 21 and 22 are pivotally mounted on the spacer bars 13 and 14 as noted earlier. At one end of each of these pairs of arms is mounted a spring loaded cam designated at 33, which will be more fully described hereinafter. The opposed pair of cams together constitute a jam cleat indicated generally at 25. The other ends of the arms 21 and 22 are pivotally joined to the arms 23 and 24. At one such joint, is mounted a pulley 26. The other ends of the arms 23 and 24 are joined together, and at this joint is mounted the pulley 27. Turning for a moment to FIGURE 4, it will be noted that the shaft 28 on which the pulley 27 is mounted extends through the joint between the pairs of arms 23 and 24, and into a slot 29 in the base plates 10a and 10b, which constrains the movement of the pulley 27 to a path generally parallel to the arms 21 and 22.

At 30 is shown a thin rod or wire, one end of which is secured to the guide 18, and the other end of which extends through a hole in the shaft 28, which joins the arms 23 and 24 and carries the pulley 27. Surrounding this rod 30 in the area between the shaft 28 and the guide 18 is a spring 31, which tends to urge the parts to the position shown in FIGURE 1.

Figure 2:
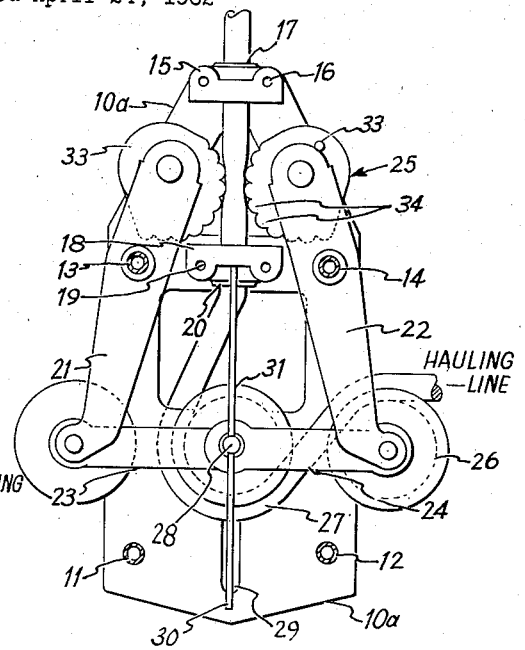
FIGURE 2 is a plan view of the invention similar to FIGURE 1, but showing the parts in another position.

In operation of this device, the line is led through the opening 17 in the guide 15, through the jam cleat 25 through the opening 20 in the guide 18, around pulley 27, and then forward and around pulley 26. When little or no force is exerted on the end of the line attached to the sail or other object to be moved, the line can be manipulated with the parts remaining in this position. However it should be apparent that when any force is exerted on the line, and when the hauling end of the line is either held or pulled, the pulley 27 will be urged against the tension of the spring 31 to a position such as shown in FIGURE 2, in which the arms 21 and 22 form substantially a straight line, i.e. the pivot points connecting the arms 21 and 23, 22 and 24, and 23 and 24 are aligned. It will be clear that the length of the slots 29 is such as to limit the movement of the pulley 27 to the position shown in FIGURE 2. As the pulley 27 moves in this direction, the arms 23 and 24 tend to extend outwardly in a toggle action, and with this motion tend to pivot the arms 21 and 22 about their shafts 13 and 14. As long as the operator maintains sufficient force on the line to hold the parts in this position, the cams will tightly hold the line, and prevent its pulling away from the operator.

Figures 3, 5, 6:
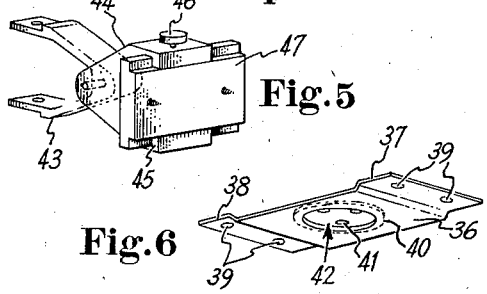
FIGURE 3 is an enlarged cross-sectional view taken along the line 3—3 of FIGURE 1.
FIGURE 5 is a perspective view of one means which may be used to mount the device of this invention.
FIGURE 6 is a perspective view of another means for mounting the instant invention.

The cams 33 are entirely conventional in their construction, but by referring to FIGURE 3, their application to this device can be more clearly understood. Each cam comprises a shaft 32, a cam member 33 (which as seen in FIGURES 1 and 2 has a plurality of teeth 34), and a spring 35 which urges the cam member 33 to the position shown in FIGURE 1. The spring 35 is so mounted that each cam can rotate against the tension of this spring toward the other, so that the line may be moved between them in one direction only.

The ease with which a line running through this device may be freed will now be apparent. By merely releasing the tension on the line, the operator will permit the parts to return under the urging of spring 31 to the position shown in FIGURE 1, which in turn will withdraw the cams and permit the line to pass freely through the device.

In FIGURE 5 is shown one method for mounting the device of the instant invention for use. A base plate 36 is provided, which has a pair of raised flanges 37 and 38. Each flange is provided with a pair of threaded holes 39 positioned to be juxtaposed over the four hollow spacer elements 11, 12, 13, and 14. A cover plate 40 is then provided which has three holes 41 arranged to form an equilateral triangle. The base plate 36 has a large circular opening in its center, as shown at 42; this opening is of such a size that it will be just tangent to the outer edge of each of the three holes 41 in the cover plate 40. To mount the instant invention, bolts, screws, or any other fastening may be inserted through the holes 41 in the cover plate 40, through the opening 42 in the base plate, and into the deck or other surface on which the device is to be mounted. Four other bolts or screws may then be inserted through the spacer elements 11, 12, 13 and 14, and screwed into the threaded holes 39 in the base plate 36. It will be understood that the device may be mounted on either side, depending on its contemplated usage. It should also be apparent that by means of this mounting, the device will be free to rotate to accommodate various operating conditions.

In FIGURE 6, still another embodiment has been disclosed. This structure contemplates the provision of a yoke 43, pivotally secured to a mounting block 44. In actual usage, it is understood that this structure, and a second structure, identical with this one, will be fastened by any suitable means to the spacer elements 11 and 13 of the device itself. The mounting block 44 is provided with a track slot 45, and a set screw 46. The track, such as shown at 47 may then be mounted in any suitable location, as for example on the bottom of the boom of a sail boat, and the mounting block may be slid into position and secured in place by means of the set screw 46. In this position, the device of this invention will hang so that the hauling end of the line will extend downwardly.

Many modifications could easily be made in this disclosure without departing from the scope and spirit of the invention. Though it has been described in terms of an exemplary embodiment, no limitation is intended other than those contained in the claims which follow and form a part of this application.

Having thus described this invention, what is claimed as new, and what is desired to be secured by Letters Patent is:

1. A device for handling a line comprising a frame, at least one arm pivotally mounted in said frame, means yieldably holding said arm in an inoperative position, line gripping means mounted on one end of said arm, and means responsive to tension on said line being handled for moving said arm and gripping means from said inoperative position into and out of an operative position to grip a line passing through said device.

2. The device claimed in claim 1 wherein said means for moving said line gripping means from an inoperative position to an operative position comprises at least one actuating arm, one end of said actuating arm being pivotally connected to the free end of said first named arm and the other end of said actuating arm being constrained to movement in a path generally parallel to said first named arm, a pair of pulleys, said pair of pulleys being respectively mounted on each end of said actuating arm, and the line being handled passing reversely around said pulleys, whereby tension on said line produces a toggle action of said actuating arm.

3. The device claimed in claim 2 wherein means are provided to limit the movement of the pulley on the constrained end of said actuating arm to a position in which said actuating arm is disposed substantially at right angles to said path.

4. A device for handling a line comprising a frame, a pair of arms pivotally mounted in said frame, means yieldably holding said arms in an inoperative position, line gripping means mounted on one end of each arm of said pair of arms, and means responsive to tension on said line being handled for moving said arms and said gripping means from said inoperative position into and out of an operative position to grip a line passing through said device.

5. The device claimed in claim 4 wherein said line gripping means comprise a pair of spring loaded cams, opposing surfaces of said cams having a plurality of teeth thereon.

6. The device claimed in claim 4 wherein said means for moving said line gripping means from an inoperative position to an operative position comprises a second pair of arms, a pulley shaft pivotally joining one end of one of said second pair of arms to the free end of one of said first pair of arms, a first pulley on said pulley shaft, one end of the other arm of said second pair of arms being pivotally joined to the free end of the other of said first pair of arms, a second pulley shaft pivotally joining the free ends of said second pair of arms, means constraining the movement of said second pulley shaft to a path generally parallel to said first named pair of arms, a second pulley mounted on said pulley shaft, and the line being handled passing reversely around said pulleys, whereby tension on said line produces a toggle action of said second pair of arms.

7. The device claimed in claim 6, wherein means are provided to limit the movement of the second pulley shaft to a position in which said second pair of arms are substantially aligned at right angles to said path.

References Cited in the file of this patent

UNITED STATES PATENTS

| 473,093 | Sockman | Apr. 19, 1892 |
| 1,216,041 | Abramson | Feb. 13, 1917 |
| 1,354,125 | Nunamaker | Sept. 28, 1920 |
| 3,018,531 | Arsenault | Jan. 30, 1962 |